Figure 1:
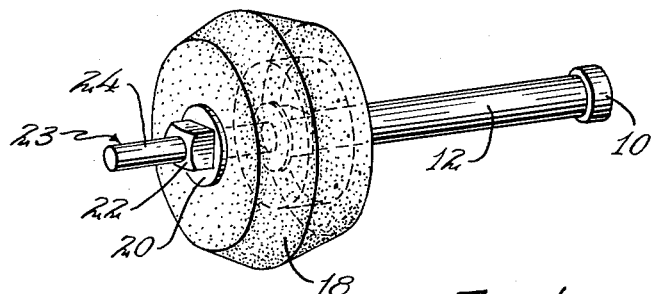

July 16, 1963  R. G. RETTERATH  3,097,456
PORTABLE SICKLE AND TOOL GRINDING DEVICES
Filed April 24, 1961

INVENTOR
Raymond G. Retterath

BY
ATTORNEY

United States Patent Office 3,097,456
Patented July 16, 1963

3,097,456
PORTABLE SICKLE AND TOOL GRINDING DEVICES
Raymond G. Retterath, Stanton, N. Dak.
Filed Apr. 24, 1961, Ser. No. 105,149
1 Claim. (Cl. 51—173)

This invention relates to an improvement in portable sickle and tool grinding devices and in particular to an apparatus which can be produced at low cost, which is readily adaptable to a multiplicity of grinding operations, and which provides positive control by the operator of the pressure and grinding angle of the grinding wheel upon the surface to be sharpened or ground.

Many portable tool grinding devices now manufactured do not allow ready interchanging of grinding wheels of different thicknesses, simplified mounting and assembly of grinding and sharpening wheels on the grinding or sharpening tool, and ready (quick) replacement of any part which should wear to an undesirable degree.

Since the machine parts often have to be sharpened or ground while attached to the machine, or much valuable time is lost in removing and replacing them after sharpening, my invention will provide a much needed improvement. My invention enables the operator to control the angle and pressure of the grinding wheel while in operation, and (by use of grinding wheels of different thicknesses) to sharpen parts attached to a machine. This directional and pressure control by the tool operator is obtained by having the operator hold the electric drill or other power device turning the grinding wheel in one hand and the handle of the grinding tool in the other.

Another important feature of the present invention is in the simple construction using a small number of easily replaceable parts. This permits the tool operator to quickly replace any part of the grinding tool which might need replacement. I have achieved this simple construction by using a one-piece spindle upon which the various parts of the sharpening tool are assembled.

A further important feature of my invention is the ease with which grinding wheels of different thicknesses may be used. This is accomplished by using a threaded portion of the spindle sufficiently long to accommodate grinding wheels of different thicknesses and threaded securing means for locking the wheels in place on the spindle.

Another feature of my invention is the tool handle which is used in controlling the pressure and angle of grinding. This handle is rotatably supported by the one-piece spindle, prevented from axial movement by the head of the spindle at one end and a securing means at the other, yet by virtue of its position on the one-piece spindle provides positive control of the grinding tool in the hands of the operator.

Another feature of my invention is the use of the spindle head to prevent axial movement of the tool handle and to provide the operator with a ready means of turning the whole spindle while tightening the securing means in place against the handle or grinding wheel.

These and other objects and novel assemblage features of the present invention will be more clearly set forth in the following specification and claims.

Figure 2:
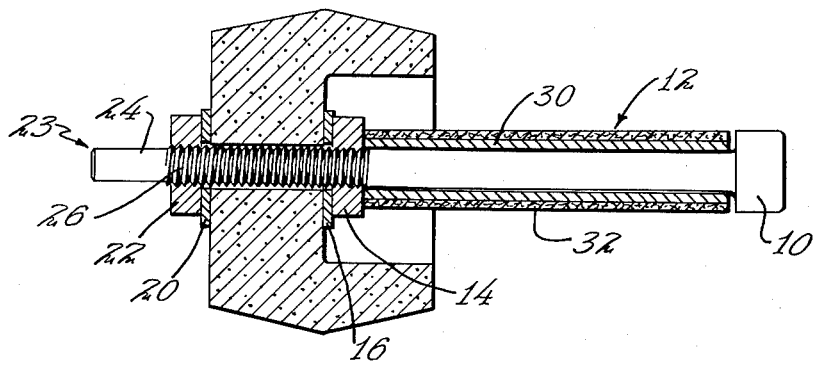

In the drawings forming a part of the specification:
FIGURE 1 is a longitudinal drawing showing the assembled tool.
FIGURE 2 is longitudinal sectional view of the assembled tool.

The sickle and tool grinding assembly includes a one-piece spindle 23 of uniform diameter throughout its length with the exception of the end 24 where the diameter is reduced to a diameter readily adaptable to a rotating means such as the chuck of an electric drill, and the other end 10 which is enlarged to provide a head which can be held by the fingers, a wrench or pliers.

The parts of the tool are assembled on the spindle in the following relationship. The handle 12 extends from the head 10 to the securing means 14, next followed by the spacer disc 16, the grinding wheel 18, another spacer disc 20, and a securing means 22.

A section of the one-piece spindle adjoining the reduced diameter end 24 is threaded as indicated at 26. This permits the use of readily removable threaded securing means 22 and 14 together with spacer discs 20 and 16 to hold the grinding wheel 18 firmly in place on the threaded section 26 of the spindle.

The tool handle 12 is rotatably supported on a cylindrical section 30 of the one-piece spindle extending from the end of the threaded section of the one-piece spindle 23 to the enlarged head 10. The handle 12 is covered with insulating material 32 to aid the tool operator in keeping a firm grip on the tool.

Thus it can be seen that the tool can be readily assembled, and grinding wheels easily changed or adjusted. Production costs are kept low by the use of a small number of parts. The device permits ready disassemblage for compact storage or remaining intact for immediate use.

In accordance with the patent statutes, I have described the principles of construction and operation of my improvement in portable sickle and tool grinding devices, and while I have endeavored to set forth the best embodiment thereof, I desire to have it understood that changes may be made within the scope of the following claim without departing from the spirit of my invention.

I claim:

A portable sickle and tool grinding and sharpening apparatus having a one piece spindle having a portion of reduced diameter at one end adapted to be connected to a turning means, said spindle including a threaded section adjoining said reduced diameter portion, a grinding wheel encircling said threaded section, threaded securing means on opposite sides of said grinding wheel on said threaded section of said spindle, washers having portions in face contact with said grinding wheel interposed between said grinding wheel and said threaded securing means, said spindle including a cylindrical bearing section adjoining said threaded section, an enlarged head at the other end of said spindle and at the end of said cylindrical bearing section, a hollow cylindrical bearing sleeve handle means encircling said cylindrical bearing section between said enlarged head and one of said threaded securing means, and a substantially cylindrical sleeve of insulating material encircling said handle means between said enlarged head and said one threaded securing means and secured to said handle means for rotation therewith, said threaded securing means being of greater periphery than said cylindrical sleeve and said enlarged head, said enlarged head being beyond the end of said handle means whereby said enlarged head may be grasped to hold the spindle from rotation.

References Cited in the file of this patent
UNITED STATES PATENTS

| | | |
|---|---|---|
| 1,123,790 | Parlmer | Jan. 5, 1915 |
| 1,902,661 | Nelson | Mar. 21, 1933 |
| 2,971,299 | Vreeland | Feb. 14, 1961 |